United States Patent
Miyajima

(10) Patent No.: US 8,353,531 B2
(45) Date of Patent: Jan. 15, 2013

(54) PASSENGER PROTECTION APPARATUS OF VEHICLE

(75) Inventor: Yoichi Miyajima, Hiroshima (JP)

(73) Assignee: Mazda Motor Corporation (JP)

( * ) Notice: Subject to any disclaimer, the term of this patent is extended or adjusted under 35 U.S.C. 154(b) by 136 days.

(21) Appl. No.: 13/025,969

(22) Filed: Feb. 11, 2011

(65) Prior Publication Data

US 2011/0241318 A1 Oct. 6, 2011

(30) Foreign Application Priority Data

Mar. 31, 2010 (JP) .................................. 2010-081730

(51) Int. Cl.
*B60R 21/205* (2011.01)
*B60R 21/231* (2011.01)
(52) U.S. Cl. .................... 280/732; 280/743.1; 280/730.1
(58) Field of Classification Search .................. 280/732, 280/743.1, 730.1, 728.1; *B60R 21/205, 21/231, B60R 21/23, 21/16*
See application file for complete search history.

(56) References Cited

U.S. PATENT DOCUMENTS

| | | | |
|---|---|---|---|
| 6,255,790 B1 | 7/2001 | Popp et al. | |
| 7,264,270 B2 * | 9/2007 | Miyata et al. | 280/743.2 |
| 8,011,691 B2 * | 9/2011 | Urushibata et al. | 280/743.2 |
| 2002/0005633 A1 | 1/2002 | Amamori | |
| 2010/0102542 A1 * | 4/2010 | Nakajima et al. | 280/743.2 |
| 2011/0062693 A1 * | 3/2011 | Williams | 280/743.2 |

FOREIGN PATENT DOCUMENTS

| | | |
|---|---|---|
| DE | 195 04 975 A1 | 8/1996 |
| DE | 196 48 268 A1 | 5/1998 |
| DE | 100 65 461 A1 | 1/2002 |
| DE | 100 65 465 A1 | 1/2002 |
| JP | 2005247118 A * | 9/2005 |
| JP | 2008222083 A * | 9/2008 |

OTHER PUBLICATIONS

The Office Action issued by the German Patent and Trade Mark Office on Sep. 7, 2012; Patent Application No. 10 2011 012 580.9; with translation.

* cited by examiner

*Primary Examiner* — Paul N Dickson
*Assistant Examiner* — Keith Frisby
(74) *Attorney, Agent, or Firm* — Studebaker & Brackett PC; Donald R. Studebaker

(57) ABSTRACT

A passenger protection apparatus comprises an airbag having a concaved receiving portion at its specified position which corresponds to a face of a small-sized passenger seated in a passenger's seat when the airbag inflates in a vehicle collision, an inflator supplying gas to the airbag in a collision of a vehicle to inflate the airbag before the passenger's seat, a position sensor detecting a longitudinal sitting position of the passenger seated in the passenger's seat, and a seatbelt device, an airbag unit for pop-up seat, and a knee airbag unit which adjust a restraint position of the passenger in accordance with the longitudinal sitting position of the passenger so that the face f the small-sized passenger is received at said receiving portion of the airbag in the vehicle collision.

8 Claims, 5 Drawing Sheets

PASSENGER PROTECTION APPARATUS OF VEHICLE

BACKGROUND OF THE INVENTION

The present invention relates to a passenger protection apparatus of a vehicle, and, in particular, relates to a passenger protection apparatus to protect a passenger seated in a passenger's (assistant's) seat.

Conventionally, a passenger protection apparatus of a vehicle, in which an airbag is configured so that a surface of the inflating airbag which faces to a passenger seated in a passenger's (assistant's) seat forms a recessed shape, is known as disclosed in US Patent Application Publication No. 2002/0005633. In such a passenger protection apparatus, an upper part of the surface of the airbag which is located above the recessed shape may function as a receiving portion to receive a face of a relatively large-sized passenger, while a lower part of the surface of the airbag which corresponds to the above-described recessed shape may function as another receiving portion to receive a face of a relatively small-sized passenger (a woman, for example). Thus, the passenger may be protected properly in accordance with the body size of the passenger.

However, there is a concern that in case the passenger is the relatively small-sized passenger, the above-described passenger protection could not necessarily receive the passenger's face at the receiving portion securely depending on the sitting position of this passenger. That is, in general, when the vehicle collides in case the seatbelt device is applied to the passenger, the passenger is controlled so that an upper body of the passenger leans forwardly, without letting a passenger's waist portion away from a seatback of the seat by a lap belt of the seatbelt device, so that the passenger's face can be received at the inflating airbag. However, there is a case in which a point (i.e., a position of the passenger's waist portion) around which the passenger's upper body leans forwardly in the vehicle collision described above changes depending on the sitting position the passenger seated in the passenger's seat, so that a position of the passenger's face changes as well. Consequently, the passenger's face could not be properly received at an appropriate receiving portion for the relatively small-sized passenger of the airbag.

SUMMARY OF THE INVENTION

The present invention has been devised in view of the above-described problem, and an object of the present invention is to provide a passenger protection apparatus of a vehicle which can properly protect a specified sized passenger, e.g., a small-sized passenger, who is seated in the passenger's (assistant's) seat in the vehicle collision.

According to the present invention, there is provided a passenger protection apparatus of a vehicle which restrains and protects a passenger seated in a passenger's seat in a vehicle collision, comprising an airbag stored in a portion of an instrument panel in front of the passenger's seat, the airbag having a concaved receiving portion at a specified position thereof which corresponds to a face of a specified sized passenger seated in the passenger's seat when the airbag inflates in the vehicle collision, an inflator stored in the portion of the instrument panel in front of the passenger's seat along with the airbag, the inflator supplying gas to the airbag in the vehicle collision to inflate the airbag before the passenger's seat, a sitting position detecting device detecting a longitudinal sitting position of the passenger seated in the passenger's seat, and a passenger restraint position adjusting device adjusting a restraint position of the passenger in accordance with the longitudinal sitting position of the passenger detected by the sitting position detecting device so that the face of the specified sized passenger is received at the receiving portion of the airbag in the vehicle collision.

According to the present invention, the restraint position of the passenger can be adjusted in accordance with the body size of the passenger which is predicted from the sitting position of the passenger detected by the sitting position detecting device in the vehicle collision. Thereby, the face of the passenger who has the specified size, e.g., the small size, can be received at the appropriate portion of the airbag when the vehicle has a collision and the airbag inflates. Accordingly, the specified sized passenger, e.g., the small-sized passenger, can be properly protected.

According to an embodiment of the present invention, the passenger restraint position adjusting device is a seatbelt device which comprises a shoulder belt and a lap belt, the seatbelt device further comprises a retractor which is equipped with a load limiter to generate a specified withdrawal resistance at the shoulder belt in the vehicle collision and a pre-tensioner to apply a tensional force to the lap belt when the vehicle collision is predicted, and the pre-tensioner is configured to apply the tensional force to the lap belt in case the longitudinal sitting position of the passenger is before a specified position. Thereby, the passenger's waist portion can be restrained rearwardly of the passenger's seat when the vehicle collision is predicted by applying the tensional force to the lap belt with the pre-tensioner in case the longitudinal sitting position of the passenger is before the specified position. Accordingly, since the passenger's position can be controlled so that the waist portion is pushed rearwardly and the upper body leans forwardly around the point of the waist portion, the face of the specified sized passenger, e.g., the small-sized passenger, can be securely at the appropriate receiving portion.

According to another embodiment of the present invention, the passenger restraint position adjusting device is a raising device to raise a front portion of a seat cushion of the passenger's seat, and the raising device is configured to raise the front portion of the seat cushion of the passenger's seat in case the longitudinal sitting position of the passenger is before a specified position. Thereby, the front portion of the seat cushion of the passenger's seat is raised by the raising device in case the longitudinal sitting position of the passenger is before the specified position. Accordingly, the passenger's thigh portion is raised and the gravity center of the passenger is moved rearwardly, so that it can be prevented that the passenger's waist portion moves forwardly due to the inertia force occurring in the vehicle collision. Consequently, since the passenger's position can be controlled so that the waist portion is pushed rearwardly and the upper body leans forwardly around the point of the waist portion, the face of the specified sized passenger, e.g., the small-sized passenger, can be securely at the appropriate receiving portion.

According to another embodiment of the present invention, the passenger restraint position adjusting device is a knee airbag unit which is arranged at a front portion of the passenger's seat and comprises a knee airbag and an inflator to supply gas to the knee airbag, and the knee airbag unit is configured to inflate the knee airbag by operating the inflator thereof in case the longitudinal sitting position of the passenger is before a specified position. Thereby, the knee airbag inflates in case the sitting position of the passenger is before the specified position. Accordingly, the knee airbag is pushed against the passenger's knee, so that it can be prevented that the passenger's waist portion moves forwardly. Consequently, since the passenger's position can be controlled so that the waist portion is pushed rearwardly and the upper body leans forwardly around the point of the waist portion, the face of the specified sized passenger, e.g., the small-sized passenger, can be securely at the appropriate receiving portion.

According to another embodiment of the present invention, the passenger protection apparatus of a vehicle further comprises a weight detecting device to detect a weight of the passenger seated in the passenger's seat, and the passenger restraint position adjusting device is configured to adjust the restraint position of the passenger in accordance with the longitudinal sitting position of the passenger detected by the sitting position detecting device and the weight of the passenger detected by the weight detecting device. Thereby, the size of the passenger can be determined considering the weight of the passenger. Accordingly, the passenger can be more securely protected based on the determination of the passenger's size.

According to another embodiment of the present invention, the receiving portion of the airbag is formed between a pair of projecting portions formed at the airbag which extends vertically. Thereby, the airbag absorbs the shock (impact) of the vehicle collision by receiving both sides of the passenger's face at inside portions of the pair of projecting portions, and the pair of projection portions receives both shoulders of the passenger. Accordingly, the passenger can be more securely protected.

According to another embodiment of the present invention, the sitting position detecting device is a position detecting device to detect a longitudinal slide position of the passenger's seat. Thereby, the sitting position of the passenger can be detected with a simple mechanism.

Other features, aspects, and advantages of the present invention will become apparent from the following description which refers to the accompanying drawings.

DETAILED DESCRIPTION OF THE INVENTION

Figure 1:
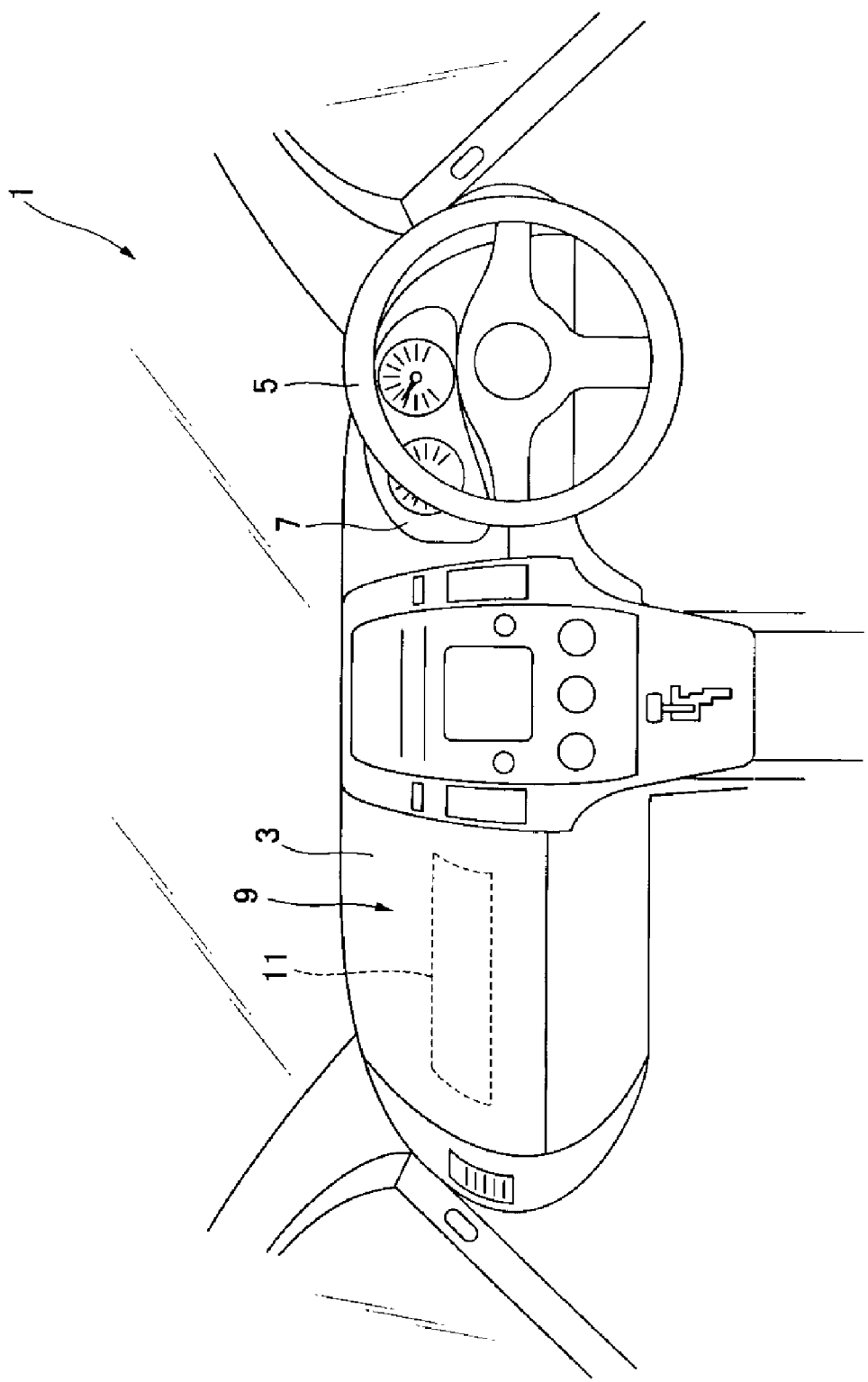
FIG. 1 is an elevation view of a front portion of a vehicle compartment of a vehicle equipped with a passenger protection apparatus according to an embodiment of the present invention.
Figure 2:
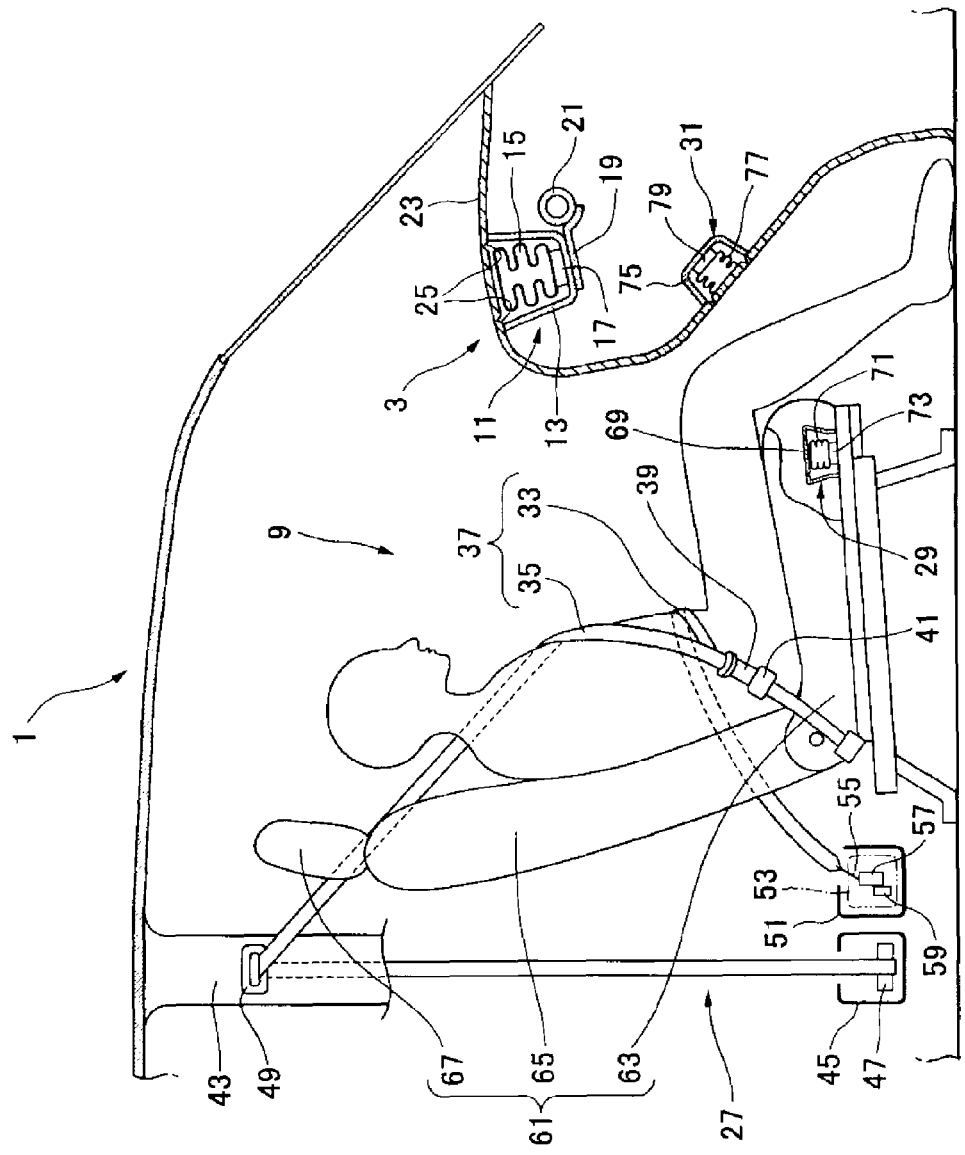
FIG. 2 is a side view of the vehicle compartment of the vehicle equipped with the passenger protection apparatus according to the embodiment of the present invention.

Hereinafter, a passenger protection apparatus of a vehicle according to a preferred embodiment of the present invention will be descried referring to the accompanying drawings. FIG. 1 is an elevation view of a front portion of a vehicle compartment of a vehicle equipped with a passenger protection apparatus according to an embodiment of the present invention. FIG. 2 is a side view of the vehicle compartment of FIG. 1.

As shown in FIG. 1, an instrument panel 3 which extends in a vehicle width direction is provided at a front portion of a vehicle compartment of a vehicle 1, and a steering wheel 5 and various meters 7 are provided at a portion of the instrument panel 3 located on the side of a driver's side. At a portion of the instrument panel 3 located on the side of a passenger's (assistant's) seat is stored an airbag unit 11 which constitutes part of a passenger protection apparatus 9 which protects a passenger seated in the passenger's seat according to the present embodiment, which will be described specifically below.

The airbag unit 11, as shown in FIG. 2, comprises a casing 13 which has an opening, an airbag 15 which is stored in the casing 13 in a fold state, and an inflator 17 which is stored in the casing 13 and supplies gas to the airbag 15 to inflate the airbag 15 before the passenger's seat. The casing 13 of the airbag unit 11 is fixed to a steering support member 21 which extends in the vehicle width direction via a bracket 19. An upper instrument panel 23 which constitutes the instrument panel 3 has V-shaped breaking grooves 25 at its lower face. These breaking grooves 25 are to be broken by inflation pressure of the airbag 15 so that the inflation of the airbag 15 is not hindered by the upper panel 23.

The passenger protection apparatus 9 comprises a seatbelt device 27, an airbag unit for pop-up seat 29, and a knee airbag unit 31, as a passenger restraint position adjusting device to adjust a restraint position of the passenger.

The seatbelt device 27 is a three point type of seatbelt device which comprises a seatbelt 37 which comprises a lap belt 33 to protect a passenger's waist portion and a shoulder belt 35 to protect a passenger's chest portion, a tongue 39 which is attached to the seatbelt 37 so as to slide along the seatbelt 37, and a buckle 4 which is detachably engaged with the tongue 39. A retractor 45 which is provided at a lower portion of a B pillar 43 is coupled to a tip of the shoulder belt 35 of the seatbelt 37. This retractor 45 includes a first pre-tensioner mechanism 47 to remove loosening of the seatbelt 37, and this first pre-tensioner mechanism 47 comprises an electric motor (not illustrated) to rotate a winding-up roller to wind up the seatbelt 37 in a winding-up direction. The first pre-tensioner mechanism 47 further has a load limiter function to cancel winding up of the seatbelt 37 when a tensional force of the shoulder belt 33 exceeds a specified value in the vehicle collision.

The seatbelt 37 extends upwardly from the retractor 45 along the B pillar 43 on the side of the passenger's seat, passes through a slip guide 49 which is provided at the B pillar 43, returns at the slip guide 49 and then extends downwardly. A tip of the lap belt 33 of the seatbelt 37 is fixed to an outside fixing portion 51 which is fixed to a vehicle body at an outside lower portion of the passenger's seat. This outside fixing portion 51 includes a second pre-tensioner mechanism 53. This second pre-tensioner mechanism 53 comprises a wire 55, one end of which is connected to the tip of the lap belt 33 of the seatbelt 37, a cylinder 57 which is connected to the other end of the wire 55, and an inflator 59 which supplies gas to the cylinder 57.

The tongue 39 is attached to a central portion of the seatbelt 37 so as to slide on the seatbelt 37. The tongue 39 is engaged with the buckle 41 fixed to the vehicle body. When the tongue 39 is engaged with the buckle 41, the seatbelt 37 protects the passenger so that the passenger's chest portion is protected by the shoulder belt 35 and the passenger's waist portion is protected by the lap belt 33.

A passenger's (assistant's) seat 61 comprises a seat cushion 63, a seatback 65 which is pivotally supported at a rear end portion of the seat cushion 63 at its lower end portion, and a headrest 67 which is attached to an upper end of the seatback 65. The airbag unit for pop-up seat 29 is arranged inside the seat cushion 63 of the passenger's seat 61. The airbag unit for pup-up seat 29 comprises, similarly to the airbag unit 11, a casing 69, an airbag for pop-up seat 71 which is stored inside the casing 69 in a fold state, and an inflator for pop-up seat 73 which supplies gas to the airbag for pop-up seat 71.

Further, the knee airbag unit 31 is stored inside the instrument panel 3 at a lower position below the airbag unit 11. The knee airbag unit 31 comprises, similarly to the airbag unit 11, a casing 75, a knee airbag 77 which is stored inside the casing 75 in a fold state, and an inflator for knee airbag 79 which supplies gas to the knee airbag 77.

Figure 3:
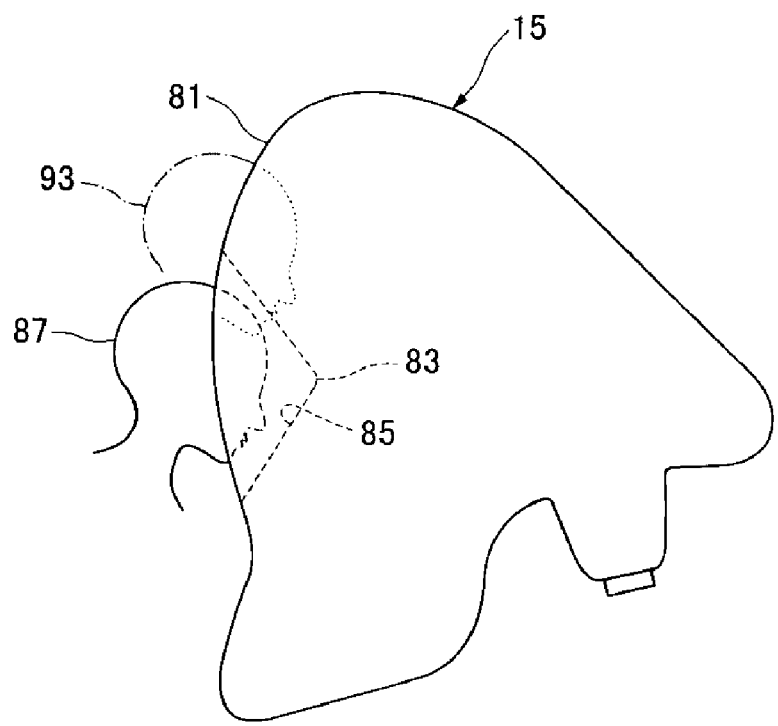
FIG. 3 is a side view showing an inflation state of an airbag of an airbag unit according to the embodiment of the present invention.
Figure 4:
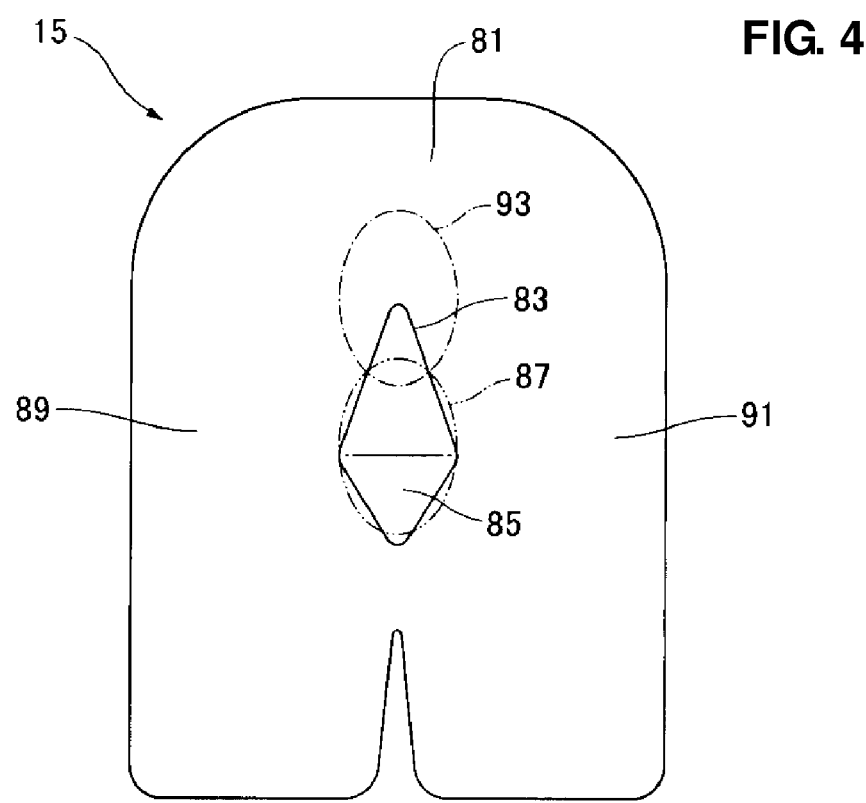
FIG. 4 is an elevation view of the airbag of FIG. 3, when viewed from the inside of the vehicle compartment.

FIG. 3 is a side view showing an inflation state of the airbag of the airbag unit, and FIG. 4 is an elevation view of the airbag of FIG. 3, when viewed from the inside of the vehicle compartment.

As shown in FIGS. 3 and 4, the airbag 15 has a receiving portion 83 at its rear face 81 which faces the passenger's seat 61 when the airbag 15 inflates in the vehicle collision. This receiving portion 83 is formed in a concaved shape at a central portion, in the vehicle width direction, of the inflating airbag 15. Further, a lower receiving face 85 which extends downwardly from the deepest portion of the receiving portion 83 is formed at the receiving portion 83. The level (height position) of the receiving portion 83 is set to correspond to a position of a face 87 of a small-sized passenger, for example. Specifically, the receiving portion 83 is positioned so that the face 87 of the small-sized passenger can be received at the lower receiving face 85 when the small-sized passenger is adjusted to a specified position by the above-described passenger restraint position adjusting device by a method which will be described below. The airbag 15 has a pair of projecting portions 89, 91 which extends vertically at both sides of the receiving portion 83 when the airbag 15 inflates. The pair of projecting portions 89, 91 is configured so that the receiving portion 83 is located therebetween. Thereby, when the passenger's face comes into the receiving portion 83, the both side portions of the passenger's face are received at respective inside portions of the pair of projecting portions 89, 91, and the passenger's shoulders and chest are received at the pair of projecting portions 89, 91.

Herein, the "small-sized passenger" means any small-sized person belonging to a group of the smallest-sized American women which is classified within 5% of the whole part of those, for example. Further, part of the rear face 81 of the airbag 15 which is located above the receiving portion 83 constitutes a receiving face to receive a face 93 of a large-sized passenger. In the present specification, the "large-sized passenger" means other persons than the above-described "small-sized passenger," for example.

Figure 5:
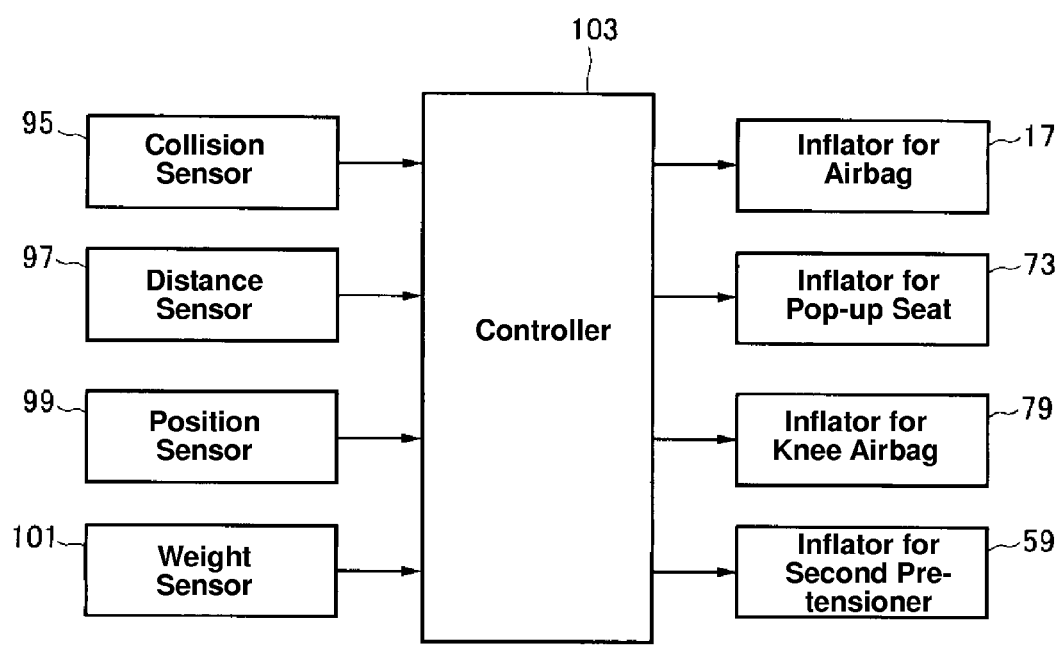
FIG. 5 is a block diagram showing a control system of the passenger protection apparatus according to the embodiment of the present invention.

FIG. 5 is a block diagram showing a control system of the passenger protection apparatus which comprises the above-described airbag unit 11, and the knee airbag unit 31, the airbag unit for pop-up seat 29 and the seatbelt device 27 as the passenger restraint position adjusting device, and so on. As shown in FIG. 5, the control system of the passenger protection device 9 comprises a collision sensor 95 as an acceleration sensor to detect the frontal collision of the vehicle 1, a distance sensor 97 to detect the distance between the vehicle 1 and an obstacle located in front of the vehicle 1, a position sensor 99 to detect the seat position of the passenger's seat 61, and a weight sensor 101 to detect the weight of the passenger seated in the passenger's seat 61, and these sensors 95, 97, 99, 101 are eclectically coupled to a controller 103. Detection results of the sensors 95, 97, 99, 101 are inputted to the controller 103.

The distance sensor 97 comprises a transmitter to transmit detection waves (infrared rays, millimeter waves, or the like) forwardly and a receiver to receive reflective waves of the detection waves from the obstacle in front of the vehicle. The time from the timing of transmission of the detection waves to the timing of receiving the reflected waves is measured, so that the distance between the vehicle and the obstacle in front of the vehicle is detected by this sensor 97. The controller 103 determines a likelihood of the vehicle collision based on the distance to the obstacle detected by the distance sensor 97.

The detection result of the longitudinal position of the passenger's seat 61 by the position sensor 99 is inputted to the controller 103. The controller 103 determines the seat position of the passenger's seat 61 based on the input result of the position sensor 99. Specifically, the controller 103 determines whether the seat position of the passenger's seat 61 is before a specified position or not.

The controller 103 determines the body size of passenger based on the detection result of the weight sensor 101. It is determined whether the passenger is the small-sized sized passenger or not through this determination of passenger's body size. Then, it is determined whether the passenger restraint position adjusting device is operated or not through this determination as to whether the passenger is the small-sized passenger or not.

The controller 103 supplies an ignition signal to the inflator 59 of the second pre-tensioner mechanism 53 when the vehicle collision is predicted based on the detection result of the distance sensor 97, so that a tension is applied to the seatbelt 37. Further, the controller 103 supplies an ignition signal to the inflator for airbag 17 when it is determined that the vehicle 1 collides with the obstacle or the like based on the detection result of the collision sensor 95, so that the airbag 15 is controlled to inflate. Moreover, the controller 103 supplies each ignition signal to each of the inflator for pop-up seat 73 and the inflator for knee airbag 79 in case the seat position of the passenger's seat 61 is before the specified position.

Figure 6:
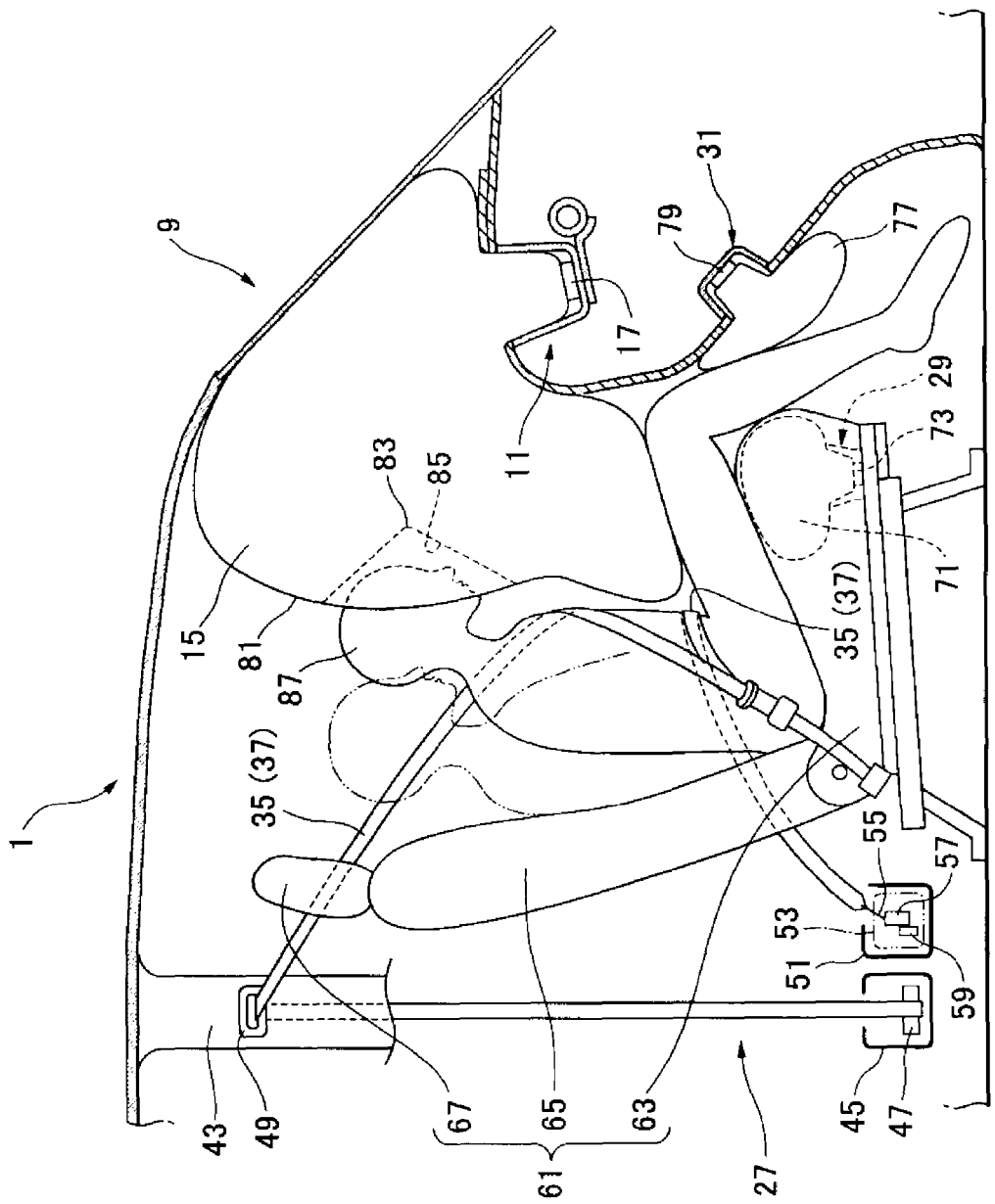
FIG. 6 is a side view of the vehicle compartment when the passenger protection apparatus according to the embodiment of the present invention is operated, when viewed from the side of a passenger's seat.

Hereinafter, the operation of the passenger protection apparatus according to the above-described present embodiment will be described. FIG. 6 is a side view of the vehicle compartment when the vehicle collides and thereby the passenger protection apparatus is operated in a state in which the passenger's seat is before the specified position and the small-sized passenger is seated in the passenger's seat.

As shown in FIG. 6, when the vehicle collision is predicted in the state in which the passenger's seat 61 is before the specified position and the small-sized passenger is seated in the passenger's seat 61, the passenger protection apparatus 9 operates the second pre-tensioner mechanism 53. Further, when the vehicle 1 collides, the passenger protection apparatus 9 operates the airbag unit 11, the airbag unit for pop-up seat 29 and the knee airbag unit 31. These are executed by the controller 103 supplying respective ignition signals to the inflator 17 of the airbag unit 11, the inflator for pop-up seat 73, the inflator for knee airbag 79, and the inflator 59 of the second pre-tensioner mechanism 53.

When the ignition signal is inputted to the inflator 59 of the second pre-tensioner mechanism 53 in case of the prediction of the vehicle collision, the inflator 59 operates to apply the tensional force to the lap belt 33 of the seatbelt device 27. Thereby, the lap belt 33 located near the passenger's waist portion is pulled so as to press the passenger's waist portion against the seatback 65. Thus, it can be prevented that the lower body of the passenger moves forwardly. Further, when the tensional force is applied to the lap belt 33, a restraint force for the lower body of the passenger is increased. Herein, in case the vehicle collides, the upper body of the passenger leans forwardly around the point of the waist portion. Thus, by operating the second pre-tensioner mechanism 53 when the vehicle collision is predicated, the passenger's position in the vehicle collision can be adjusted so that the waist portion is restrained toward the seatback 65 and the upper body leans forwardly around the point of the waist portion. Accordingly, by adjusting the passenger's position this manner, it can be prevented that the face 87 of the small-sized passenger hits another position of the airbag 15 than the receiving face 85 of the receiving portion 83. Consequently, the face 87 of the small-sized passenger can be securely received at the receiving face 85 of the airbag 15.

Meanwhile, when the ignition signal is inputted to the inflator for pop-up seat 73, this inflator 73 operates to inflate the airbag for pop-up seat 71. Thereby, the upper face of the front portion of the seat cushion 63 of the passenger's seat 61 is raised, so that the thigh portion of the passenger seated in the passenger's seat 61 goes up and accordingly the gravity center of the passenger is moved rearwardly. Consequently, the passenger's waist portion is pushed back to the seatback 65, so that it can be prevented that the passenger's waist portion moves forwardly. Thus, by operating the airbag for pop-up seat 71, the passenger's position can be adjusted so that the waist portion is restrained toward the seatback 65 and the upper body leans forwardly around the point of this waist portion. Thereby, it can be prevented that the face 87 of the small-sized passenger hits another position of the airbag 15 than the receiving face 85 of the receiving portion 83. Consequently, the face 87 of the small-sized passenger can be more securely received at the receiving face 85 of the airbag 15.

Moreover, when the ignition signal is inputted to the inflator for knee airbag 79, this inflator 79 operates to inflate the knee airbag 77 in front of the passenger's knees. Thereby, the knees of the passenger are pushed rearwardly, so that the passenger's waist portion is restrained and consequently it can be prevented that the passenger's waist portion moves forwardly. Thus, by operating the knee airbag 77, the passenger's position can be adjusted so that the waist portion is restrained toward the seatback 65 and the upper body leans forwardly around the point of this waist portion. Thereby, it can be prevented that the face 87 of the small-sized passenger hits another position of the airbag 15 than the receiving face 85 of the receiving portion 83. Consequently, the face 87 of the small-sized passenger can be more securely received at the receiving face 85 of the airbag 15.

In case, however, the passenger's seat 61 is not before the specified position, the passenger restraint position adjusting device is not operated. That is, in case the small-sized passenger is seated in a state the passenger's seat 61 is located in back of the specified position, a lock mechanism (not illustrated) of a retractor of a normal seatbelt device, for example, is operated in the vehicle collision, without operating the passenger restraint position adjusting device. Accordingly, since the waist portion of the small-sized passenger is moved forwardly up to a lock position where the seatbelt comes to be locked due to the inertia force occurring in the vehicle collision, the passenger leans forwardly around the point of the waist portion at the above-described lock position. Thereby, it can be prevented that the face 87 of the passenger hits a lower portion below the receiving face 85, for example.

Further, the passenger protection apparatus does not operate the passenger restraint position adjusting device regardless of the seat position of the passenger's seat 61 in case the passenger seated in the passenger's seat 61 is a large-sized passenger as well. This is done by the controller 103 determining the body size of the passenger based on the detection result of the weight sensor 101. In case the large-sized passenger is determined, the controller 103 does not operate the passenger restraint position adjusting device regardless of the seat position of the passenger's seat 61.

As described above, according to the passenger protection apparatus of a vehicle, in case the seat position of the passenger's seat is before the specified position, the passenger's position is adjusted by using the second pre-tensioner mechanism 53 of the seatbelt device 27, the airbag unit for pop-up seat 29, and the knee airbag unit 31 as the passenger restraint position adjusting device. Meanwhile, in case the seat position of the passenger's seat is located in back of the specified position, the passenger restraint position adjusting device is not operated. The face 87 of the small-sized passenger can be securely received at the receiving face 85.

The present invention should not be limited to the above-described embodiment, and any other modifications and improvements may be applied within the scope of a sprit of the present invention.

For example, while the above-described embodiment discloses an example in which the second pre-tensioner mechanism 53 of the seatbelt device 27, the airbag unit for pop-up seat 29, and the knee airbag unit 31 are applied together as the passenger restraint position adjusting device, any one of those may be used singly. Further, while the determination of the body size of passenger is done for two classifications, i.e., the small-sized passenger or the large-sized passenger, in the above-described embodiment, the body size of passenger may be classified into more sizes so that the number of devices, as the passenger restraint position adjusting device, to be operated in the vehicle collision is changed in accordance with the body size of passenger. Moreover, the seat position of the passenger' seat may be classified into more plural positions so that the number of devices, as the passenger restraint position adjusting device, to be operated in the vehicle collision is changed in accordance with these seat positions.

Further, the relieving portion 83 of the airbag 15 is formed between the pair of projecting portions 89, 91 in the above-described embodiment. However, the present invention is applicable to a passenger protection apparatus equipped with an airbag which has any receiving portion without forming the pair of projecting portions.

Moreover, it is determined based on the body size of the passenger detected by the weight sensor 103 whether the passenger restraint position adjusting device is operated or not in the above-described embodiment. However, this determination may be conducted based on the body size of the passenger which is detected from the detection result of the seat position sensor 99, considering that in general the seat position for the small-sized passenger is located forwardly, while the seat position for the large-sized passenger is located rearwardly.

What is claimed is:

1. A passenger protection apparatus of a vehicle which restrains and protects a passenger seated in a passenger's seat in a vehicle collision, comprising:

an airbag stored in a portion of an instrument panel in front of the passenger's seat, the airbag having a concaved receiving portion at a specified position thereof which corresponds to a face of a specified sized passenger seated in the passenger's seat when the airbag inflates in the vehicle collision;

an inflator stored in the portion of the instrument panel in front of the passenger's seat along with the airbag, the inflator supplying gas to the airbag in the vehicle collision to inflate the airbag before the passenger's seat;

a sitting position detecting device detecting a longitudinal sitting position of the passenger seated in the passenger's seat; and a passenger restraint position adjusting device adjusting a restraint position of the passenger in accordance with the longitudinal sitting position of the passenger detected by said sitting position detecting device so that the face of said specified sized passenger is received at said receiving portion of the airbag in the vehicle collision.

2. The passenger protection apparatus of a vehicle of claim 1, wherein said passenger restraint position adjusting device is a seatbelt device which comprises a shoulder belt and a lap belt, the seatbelt device further comprises a retractor which is equipped with a load limiter to generate a specified withdrawal resistance at the shoulder belt in the vehicle collision and a pre-tensioner to apply a tensional force to the lap belt when the vehicle collision is predicted, and the pre-tensioner is configured to apply the tensional force to the lap belt in case the longitudinal sitting position of the passenger is before a specified position.

3. The passenger protection apparatus of a vehicle of claim 1, wherein said passenger restraint position adjusting device is a raising device to raise a front portion of a seat cushion of the passenger's seat, and the raising device is configured to raise the front portion of the seat cushion of the passenger's seat in case the longitudinal sitting position of the passenger is before a specified position.

4. The passenger protection apparatus of a vehicle of claim 1, wherein said passenger restraint position adjusting device is a knee airbag unit which is arranged at a front portion of the passenger's seat and comprises a knee airbag and an inflator to supply gas to the knee airbag, and the knee airbag unit is configured to inflate the knee airbag by operating the inflator thereof in case the longitudinal sitting position of the passenger is before a specified position.

5. The passenger protection apparatus of a vehicle of claim 1, further comprising a weight detecting device to detect a weight of the passenger seated in the passenger's seat, and said passenger restraint position adjusting device is configured to adjust the restraint position of the passenger in accordance with the longitudinal sitting position of the passenger detected by said sitting position detecting device and the weight of the passenger detected by said weight detecting device.

6. The passenger protection apparatus of a vehicle of claim 1, wherein said receiving portion of the airbag is formed between a pair of projecting portions formed at the airbag which extends vertically.

7. The passenger protection apparatus of a vehicle of claim 1, wherein said sitting position detecting device is a position detecting device to detect a longitudinal slide position of the passenger's seat.

8. The passenger protection apparatus of a vehicle of claim 1, wherein said specified sized passenger is a small-sized passenger.

* * * * *